United States Patent [19]

Salomon

[11] 4,159,368

[45] Jun. 26, 1979

[54] PROCESS FOR OBTAINING POLYSTYRENE FOAM

[75] Inventor: Georges P. J. Salomon, Annecy, France

[73] Assignee: Etablissements Francois Salomon et Fils, Annecy, France

[21] Appl. No.: 726,738

[22] Filed: Sep. 27, 1976

[30] Foreign Application Priority Data

Oct. 1, 1975 [FR] France .............................. 75 30065

[51] Int. Cl.² .............................................. C08J 9/00
[52] U.S. Cl. ........................................ 521/55; 264/53; 264/DIG. 83; 521/60; 521/146
[58] Field of Search ........ 260/2.5 B, 2.5 BD, 2.5 HB, 260/2.5 P; 521/55

[56] References Cited

U.S. PATENT DOCUMENTS

| | | | |
|---|---|---|---|
| 2,023,204 | 12/1935 | Munters et al. ................ | 260/2.5 HB |
| 3,242,238 | 3/1966 | Edberg et al. ................ | 260/2.5 HB |
| 3,419,506 | 12/1968 | Gander ................ | 260/2.5 P |
| 3,503,907 | 3/1970 | Bonner, Jr. ................ | 260/2.5 P |
| 3,657,164 | 4/1972 | Jastrow et al. ................ | 260/2.5 HB |
| 3,725,318 | 4/1973 | Bengtson ................ | 260/2.5 BD |
| 3,753,932 | 8/1973 | Jenkins ................ | 260/2.5 BD |

FOREIGN PATENT DOCUMENTS 569695  1/1959  Canada .............................. 260/2.5 BD

*Primary Examiner*—Edward M. Woodberry
*Attorney, Agent, or Firm*—Pollock, Vande Sande & Priddy

[57] ABSTRACT

Polystyrene (copolymer) foam is produced by forming a polystyrene (copolymer) solution in an hermetically sealed container using a solvent having a high vapor pressure and a low boiling point, and progressively releasing the thus formed solution under temperature and pressure conditions allowing rapid evaporation of the solvent.

13 Claims, No Drawings

PROCESS FOR OBTAINING POLYSTYRENE FOAM

The present invention relates to a process for obtaining a polystyrene foam or a polystyrene copolymer foam.

Various processes are known for obtaining porous resins generally known as "foams".

For example, foams of this kind may be obtained as follows:

(a) by adding to one of the polymerization components a pore-producing agent which releases a gas by reacting with one of the other components, in which case the pores are formed by chemical action;

(b) by mixing with the polymer a liquid or solid product adapted to pass into a gaseous phase under the action of heat, in which case the formation of the pores is to some extent mechanical.

These two processes require that quantities of the product be metered or the provision of special receptacles which can be used only once, and they require a certain amount of setting up, etc. They are thus not easily accessible for the public.

The present invention is concerned with a particularly simple process for obtaining foams.

Generally speaking, the process according to the invention is characterized in that:

(a) a solvent, or a mixture of solvents, which is in the gaseous state when it is subjected to atmospheric pressure and when it is at a temperature of about 20°–25° C., is added to the polystyrene or the polystyrene copolymer;

(b) the solution thus obtained is held under ambient conditions which inhibit the volatilization of the solvent or mixture of solvents;

(c) the ambient environment is then modified to cause the solvent or solvents to volatilize and the polystyrene to expand.

Thus the concept of the present invention is to be perceived in that the polystyrene or polystyrene copolymer is placed in solution by means of a solvent that exhibits a liquid or solid phase under conditions of temperature and pressure below those normally found in free air (atmospheric pressure and a temperature in the vicinity of 20°–25° C.), and that exhibits a gaseous phase when the solvent is under normal atmospheric conditions.

It will immediately be understood that that when the polystyrene-solvent solution is caused to pass from conditions under which the solvent is in the liquid phase, to conditions under which it can change to the gaseous phase, the solvent will tend to escape spontaneously. This will increase the viscosity of the solution, and the volatilization of the solvent will form pores in the product, the pores becoming trapped therein when the product solidifies.

According to the invention, therefore, the solvent used has a low boiling point and, preferably, a vapor pressure in excess of 0.5 kg/cm² at a temperature of 20° C.

Thus, whereas in conventional processes, the polymer is dissolved in organic solvents, such as acetone, methyl ethyl acetone, ethyl acetate, benzene xylene, "white spirit", etc., preference is given, according to the present invention, to solvents such as chlorofluorinated hydro-carbons, the main advantages of which are as follows:

(a) very high vapour pressure, which means that they evaporate rapidly at normal ambient temperatures;
(b) non-inflammability;
(c) high thermal stability;
(d) non-toxicity.

More particularly, use is made, according to the invention, of dichlorofluoromethane and trichlorofluoromethane.

According to one special aspect of the invention, the polystyrene is subjected to pre-expansion prior to dissolution in the solvent.

It is, of course, possible to use a pre-expanded polystyrene which is commercially available, or the basic polymer may be pre-expanded. In the latter case, pre-expansion is preferably effected by the application of heat from steam.

Actually the pre-expansion method is preferable since the water vapor, on the one hand, releases a large quantity of heat at the moment of condensation, and, on the other hand, diffuses rapidly into the interior of the particles.

Steam pre-expansion takes between 20 seconds and 10 minutes, depending upon the apparent density to be obtained.

An apparent density of between 50 and 200 gr/1 is considered sufficient for the execution of the process according to the invention. It is, of course, possible to use a lower density, since the lower the density, the greater the ease with which the pre-expanded polystyrene can be dissolved, but there are practical objections to the use of a polystyrene of unduly low density. On the other hand, if the density is too high, it is difficult to dissolve the polystyrene.

The use of pre-expanded polystyrene to form the solution has several advantages. Above all, it makes available to the consumer, in a highly practical way, a soluble polystyrene which can be converted instantly into foam without any special processing.

Attempts have already been made to dissolve polystyrene available commercially in the form of beads or rods, using conventional organic solvents, but this is very difficult unless the mixture is ground.

It would be still more difficult with conventional mixing equipment (mixers, turbo-mixers, Werner-type mixers, etc.) if, as with the present invention, the solvents used have a vapor pressure in excess of 0.5 kg/cm² at 20° C., and often in excess of 1 kg/cm², since, if products of constant quality are to be obtained, this becomes a highly delicate operation.

Surprisingly enough, it has been discovered that these disadvantages may be eliminated by using pre-expanded polystyrene.

It is known that when polystyrene beads, obtained from the polymerization of styrene, or of a styrene-acrylonitrile mixture, or of another sytrene copolymer are heated with a pore-producing agent (a low-boiling-point hydrocarbon such as pentane), the particles soften and dilate under the action of the vapor pressure of the hydrocarbon included in the interior.

The resulting increase in volume is accompanied by the formation of closed cells, generally of a diameter of between 0.01 and 0.2 mm.

It will be understood that a pre-expanded product of this kind has a larger area in contact with the solvent added thereto, and this very greatly facilitates the dissolving operation. In fact, when the amount of solvent used is large in relation to the amount of pre-expanded polystyrene, the operation becomes instantaneous.

In this connection, the amount by volume of solvent used may be between 15 and 95% of the total weight of the solution. It should be noted that the uniformity of expansion of the product may be improved by using the conventional "surfactants" used in producing conventional foams such as rigid or flexible polyurethane, polyvinyl chloride, etc.

According to the invention, however, it is preferable to use silicone oils, more particularly dimethyl siloxanes, since the presence of this silicone makes it possible to form the cells at a lower concentration of gas, thus eliminating uncontrolled expansion beginning with large bubbles.

Since the expanded polystyrene thus produced is not very resilient, it is desirable to add plasticizers to the mixture, if a flexible foam is to be obtained.

It is possible to incorporate into the mixture any plasticizer compatible with polystyrene, e.g., adipates, phtalates, certain butadiene-acrylonitrile elastomers, polyisobutylene, certain fatty-acid esters, etc.

On the other hand, certain paraffin oils or chlorinated paraffins must be avoided since, as they age, these may alter the properties of the materials produced.

Another aspect of the invention is that concerned with a process for obtaining a polystyrene foam, characterized in that:

(a) the pre-expanded polystyrene is placed in a pressuretight receptacle, more particularly of the "aerosol" type;

(b) the receptacle is sealed hermetically and an orifice is provided for the introduction of other components;

(c) an amount of liquid solvent sufficient to render the polystyrene soluble is added to the receptacle under pressure, the solvent being in the gaseous state at atmospheric pressure and at a temperature of 20° C.;

(d) the pressure obtaining in the receptacle is maintained, in order to keep the polystyrene in the dissolved state; and (e) the solution is then released from the receptacle into an environment in which the pressure and/or temperature allow the solvent to pass to the gaseous phase, the gas, as it escapes, causing an increase in the viscosity of the product and forming internal pores.

It should be noted that an aerosol receptacle designed to accommodate dichlorofluoromethane must be able to withstand a pressure of 10 bars.

The introduction of a pre-weighed quantity of preexpanded polystyrene, and possible additives, such as plasticizers and surfactants, is carried out at atmospheric pressure, whereas the solvent is preferably introduced at the pressure at which it is kept in the liquid state.

Decanting of the solvent may be facilitated by cooling the receptacle to be filled, or by fitting thereto a blow-off cock, so that the receptacle to be filled is at no time pressurized, or by compressing the filler gas, in order to avoid the establishment, between the pressure obtaining in the filler receptacle and that obtaining in the receptacle to be filled, or an equilibrium which would prevent the latter from being filled.

Here again, depending upon the power of the solvent, the solid/solvent weight ratio may vary between 95/10 and 20/80.

The dissolving action may in certain cases be facilitated by subsequent agitation of the receptacle ( a vibrator, tumbler, "Turbula", oscillator, shaker, etc..).

Finally, the present invention is concerned, by way of a new industrial product, with a pre-expanded polystyrene or polystyrene copolymer adapted to be placed in solution in a gaseous solvent under normal atmospheric conditions.

It is also concerned, by way of a new industrial product, with a solution of pre-expanded polystyrene or polystyrene copolymer and solvent, possibly with the addition of plasticizers and/or surfactants, contained in an aerosol-type receptacle.

Four examples of embodiment of the invention will now be given:

EXAMPLE 1

Polystyrene beads, averaging 0.6 mm in diameter, are pre-expanded. This pre-expansion is carried out with steam (for less than one minute at 100° C.), or with hot air in a furnace (10 minutes at 100° C.), until an apparent density of the order of 100 g/l (average grain size≈1.5-1.6 mm) is obtained.

100 g of pre-expanded polystyrene are introduced into an aerosol receptacle.

2g of dimethyl silicon oil are introduced.

The receptacle is sealed hermetically and 200 g of dichlorofluoromethane are introduced.

The product is now ready for use. It may be injected into a closed mold adequately vented, or into a cavity. The expansion may be accelerated and increased by the application of heat (hot air, infra-red, steam, etc.) or by establishing a vacuum. In view of the low viscosity of the product, it may also be projected by atomization.

EXAMPLE 2

50 g of pre-expanded polystyrene-acrylonitrile copolymer are dissolved in an aerosol receptacle, as in Example 1, in a mixture of 90 g of dichlorofluoromethane and 20 g of trichlorofluoromethane to which have been added 15 g of a polyisobutylene having an average molecular mass of 820. This produces a solution which may be used under the conditions indicated above.

EXAMPLE 3

100 parts by weight of powdered acrylonitrilebutadiene-styrene copolymer are dissolved, in an aerosol receptacle as in Example 1, in 300 parts by weight of dichlorofluoromethane. The resulting solution is used under the same conditions as in the preceding examples. Elimination of the solvent produces a foam less brittle than that obtained with pure polystyrene.

EXAMPLE 4

100 parts by weight of butadiene-styrene copolymer (70 parts of butadiene to 30 parts of styrene) are introduced into an aerosol receptacle, and 4 parts by weight of dimethyl siloxane having a viscosity of 500 centistokes are added. Thereafter, 200 parts by weight of dichlorofluoromethane are added to the receptacle.

The butadiene-styrene copolymer is in powder form, and the foam obtained is naturally flexible.

The foregoing examples are not to be regarded as restrictive, and it will be understood that the process according to the invention may be used to dissolve all kinds of polystyrene-based mixtures to which various types of polystyrene copolymers are added.

Furthermore, the invention has a wide range of applications, especially in buildings for sound and heat insulation, for insulation in automobiles, in naval construction (floating caissons for ships), etc.

What is claimed is:

1. A process for obtaining a polystyrene foam, comprising the steps of
   (a) placing pre-expanded polystyrene or polystyrene copolymer in a pressure-tight receptacle having an orifice for the introduction of other components;
   (b) injecting through said orifice a quantity of liquid solvent sufficient to render the polystyrene soluble into the receptacle, said solvent being in the gaseous phase at atmospheric pressure and at a temperature of about 20° C.;
   (c) closing the receptacle hermetically;
   (d) maintaining the pressure obtained in the receptacle in order to keep the polystyrene dissolved; and
   (e) releasing the solution from the receptacle into an environment permitting said solvent to pass into the gaseous phase, whereby the gas, in escaping, increases the viscosity of the product and promotes the formation of internal pores.

2. A process according to claim 1, wherein the apparent density of the pre-expanded polystyrene to be placed in solution is between 50 and 200 g/l.

3. A process according to claim 1, wherein the proportion by weight of solvent used is between 15 and 95% of the total weight of the solution.

4. A process according to claim 1, wherein the solution contains a surfactant.

5. A process according to claim 4, wherein said surfactant is a silicone oil.

6. A process according to claim 5, wherein said silicone oil comprises dimethyl siloxanes.

7. A process according to claim 1, wherein said solution contains a plasticizer.

8. A process according to claim 7, wherein said plasticizer is selected particularly from the group consisting of adipates, phthalates, certain butadiene-acrylonitrile elastomers, polyisobutylenes and certain fatty-acid esters.

9. A process according to claim 1, wherein said solvent is a low-boiling-point solvent.

10. A process according to claim 9, wherein said solvent has a vapor pressure in excess of 0.5 kg/cm$^2$ at 20° C.

11. A process according to claim 10, wherein said solvent is a chlorofluorinated hydrocarbon.

12. A process according to claim 11, wherein said solvent used is at least one of dichlorofluoromethane or trichlorofluoromethane.

13. An industrial product, comprising a solution of pre-expanded polystyrene and solvent, accommodated in a pressurized receptacle of the aerosol type, said solvent being in the gaseous phase at atmospheric pressure and at a temperature of about 20° C.

* * * * *